(12) United States Patent
Materne et al.

(10) Patent No.: US 8,196,286 B2
(45) Date of Patent: Jun. 12, 2012

(54) COIL HOLDING ASSEMBLY

(75) Inventors: Thomas Materne, Luedinghausen (DE); Guenter Strelow, Bochume (DE); Uwe Dreihaus, Hamm (DE); Stephan Hoheisel, Dortmund (DE)

(73) Assignee: Wilo AG, Dortmund (DE)

( * ) Notice: Subject to any disclaimer, the term of this patent is extended or adjusted under 35 U.S.C. 154(b) by 473 days.

(21) Appl. No.: 12/440,091

(22) PCT Filed: Jul. 17, 2007

(86) PCT No.: PCT/EP2007/006311
§ 371 (c)(1),
(2), (4) Date: Mar. 6, 2009

(87) PCT Pub. No.: WO2008/028536
PCT Pub. Date: Mar. 13, 2008

(65) Prior Publication Data
US 2010/0077601 A1    Apr. 1, 2010

(30) Foreign Application Priority Data

Sep. 6, 2006  (DE) .......................... 10 2006 041 715

(51) Int. Cl.
*H01F 7/06*    (2006.01)

(52) U.S. Cl. ...... 29/605; 29/606; 29/603.24; 29/603.26; 242/365.3; 242/365.6; 242/365.8; 242/366; 310/179; 310/194; 310/198; 310/199; 310/201

(58) Field of Classification Search ................ 29/602.1, 29/605, 606, 603.24, 603.26, 603.236; 310/179, 310/194, 198, 199, 201, 210; 242/365.3, 242/365.6, 365.8, 366, 328, 329
See application file for complete search history.

(56) References Cited

U.S. PATENT DOCUMENTS 6,081,059 A     6/2000  Hsu .............................. 310/179
6,091,211 A *   7/2000  Koga et al. ............... 315/368.28

FOREIGN PATENT DOCUMENTS

GB      2032708         5/1980
JP      55133520 A  *  10/1980

* cited by examiner

*Primary Examiner* — Paul D Kim
(74) *Attorney, Agent, or Firm* — Andrew Wilford

(57) ABSTRACT

A coil-holding assembly for an electrical machine has coil holders made of plastic and on which coils of a stator can be wound. The coil holders are formed and pivotal on an outer edge of a planar central plastic support by integral film hinges between a winding position parallel to a plane of the support and a bent-up position perpendicular to the plane. Thus the coils can be wound on the holders in the parallel position thereof and the holders are then moved into the bent-up position for use in the electric machine.

9 Claims, 5 Drawing Sheets

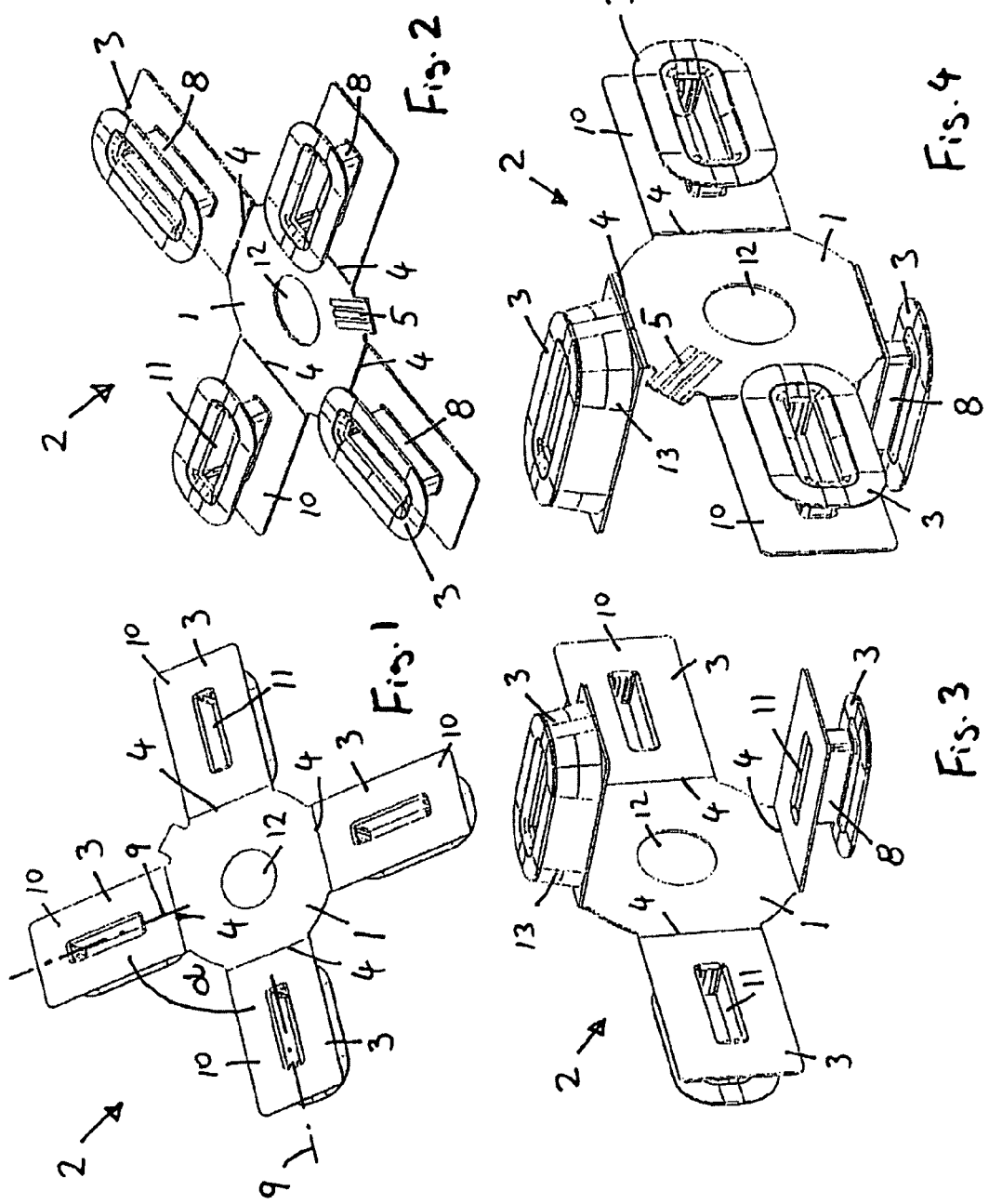

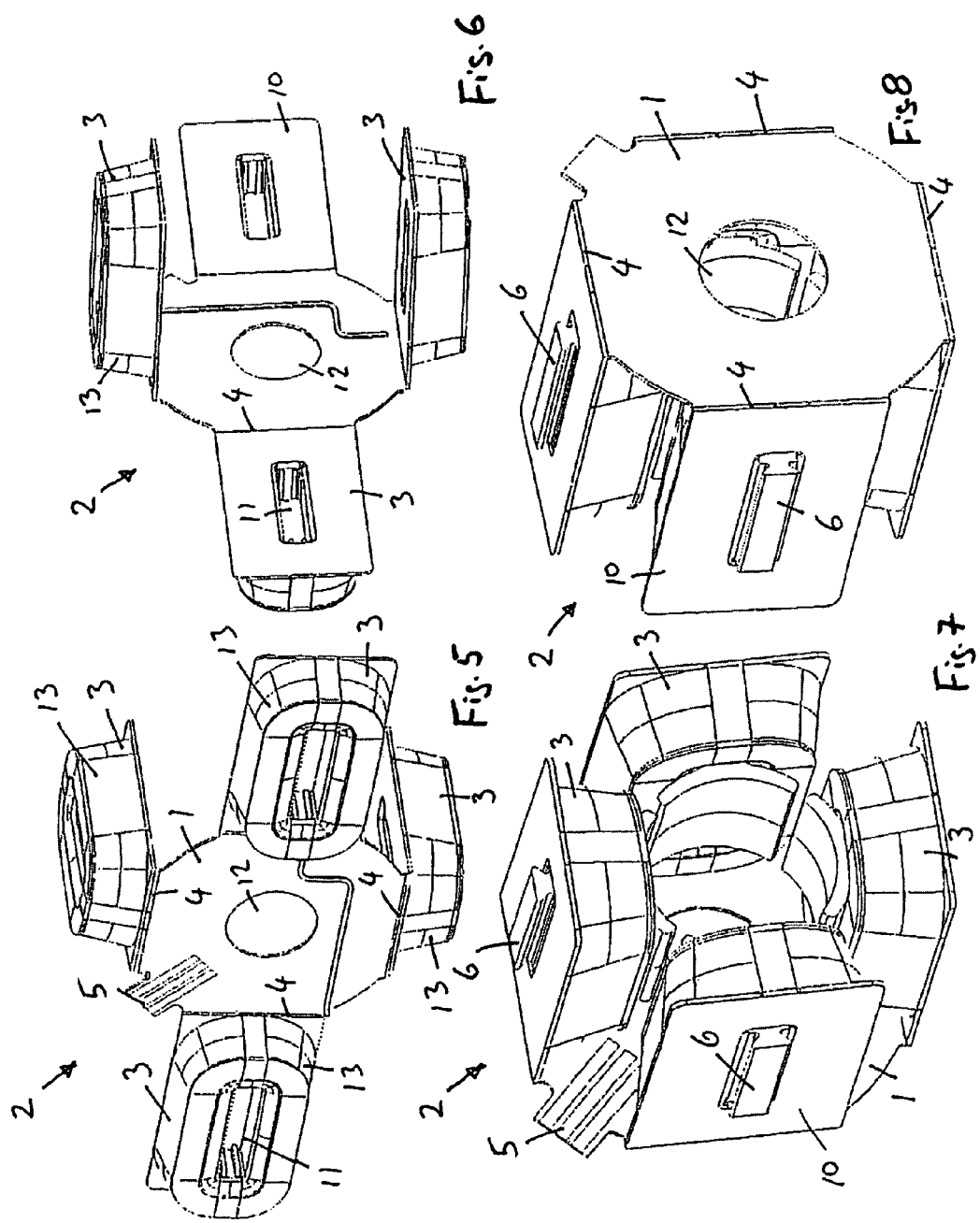

COIL HOLDING ASSEMBLY

CROSS REFERENCE TO RELATED APPLICATIONS

This application is the US national stage of PCT application PCT/EP2007/006311, filed 17 Jul. 2007, published 13 Mar. 2008 as WO2008/028536, and claiming the priority of German patent application 102006041715.1 itself filed 6 Sep. 2006, whose entire disclosures are herewith incorporated by reference.

BACKGROUND OF THE INVENTION

The invention relates to a coil-holding assembly for an electrical machine, in particular for an electric motor, having coil holders made of plastic on which coils of a stator can be wound.

Various methods for winding coil holders and assembling them into electric motors are known. In this connection, individual coils are provided on individual pole pieces. This is labor-intensive and cost-intensive, and makes large-scale mass production difficult.

OBJECT OF THE INVENTION

It is the object of the invention to simplify the production and assembly of electrical machines and to facilitate mass production.

SUMMARY OF THE INVENTION

This object is attained according to the invention in that the coil holders are pivoted on, more particularly formed on, the outer edge of a central plastic support, by hinges, in particular film hinges.

In this way, the coil holders are fully accessible for winding, in particular for winding and assembly machines, and the coil holders are connected with one another right from the start. Optionally, the coil holders can be wound individually or in pairs, with the coil holders always assuming secure, defined positions. Also, the central support can carry out not only its holding function but rather, additionally, also tasks in electrical/electronic areas, in particular. The number of parts is significantly reduced, and the production reliability and production accuracy are increased. Only one mount is required, and a single unit, which can easily be checked, is created.

BRIEF DESCRIPTION OF THE DRAWING

An embodiment of the invention, having four coil holders, is shown in perspective in the drawings and will be explained in greater detail below. Therein:

FIG. 1 is a top view of the coil-holding assembly with the coil holders in one plane, FIG. 2 is a bottom view of the coil-holding assembly with the coil holders in one plane, FIG. 3 is a rear view of the coil-holding assembly with two of the coil holders bent backward and one holder wound, FIG. 4 is a front view of the coil-holding assembly with two of the coil holders bent backward and one holder wound, FIG. 5 is a rear view of the coil-holding assembly with two of the coil holders bent backward and one holder wound, with four windings, i.e. coils, FIG. 6 is a rear 180° reversed view of the coil-holding assembly with two other coil holders bent backward, with one wound coil holder, with four windings, i.e. coils, FIG. 7 is a front view of the coil-holding assembly with all the coil holders in the working position and with four windings, i.e. coils, FIG. 8 is a rear view of the coil-holding assembly with all the coil holders in the working position and with four windings, i.e. coils, FIG. 9 a rear view of the coil-holding assembly according to FIG. 8, with a flux ring.

DETAILED DESCRIPTION

Figure 10:
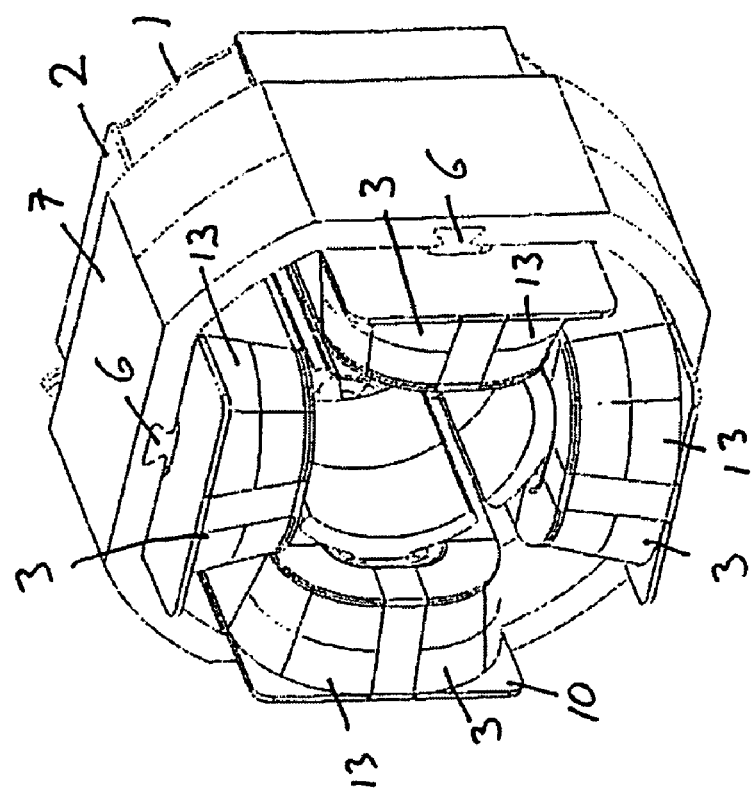
FIG. 10 is a front view of the coil-holding assembly according to FIG. 8 with a flux ring.
Figure 9:
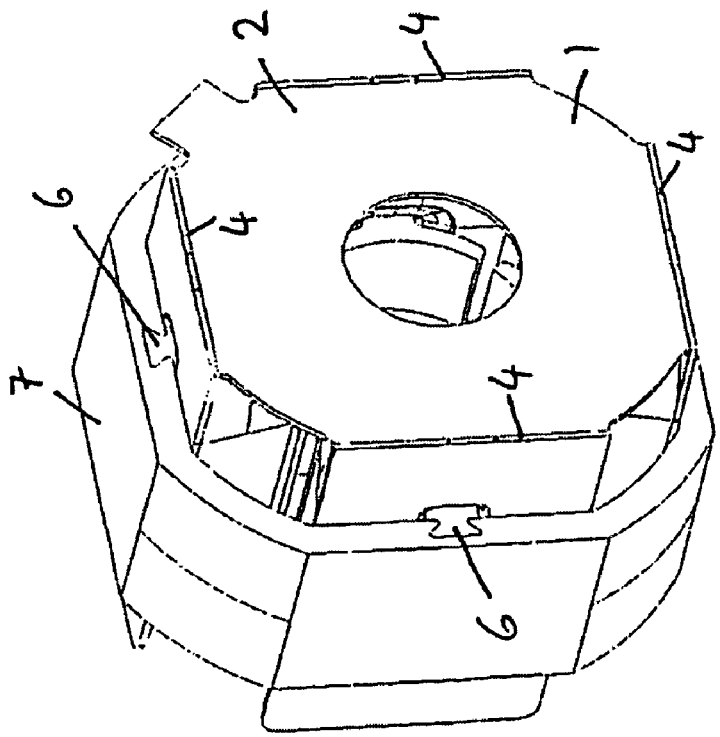
Figure 12:
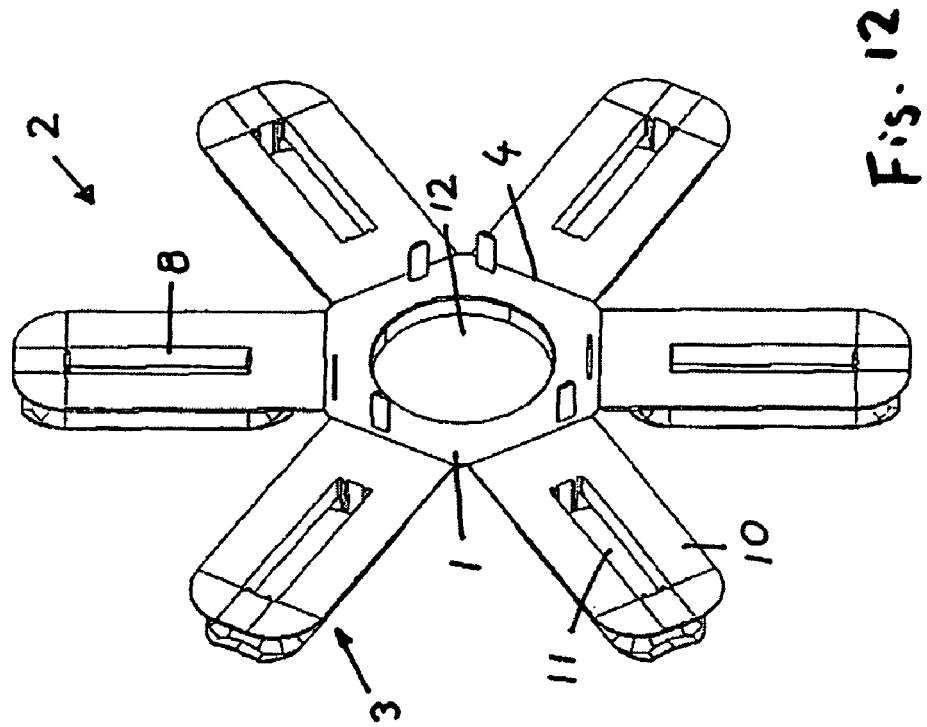
FIG. 12 is a rear view of a coil-holding assembly having six coil holders, in a position in which they are not yet bent up.
Figure 11:
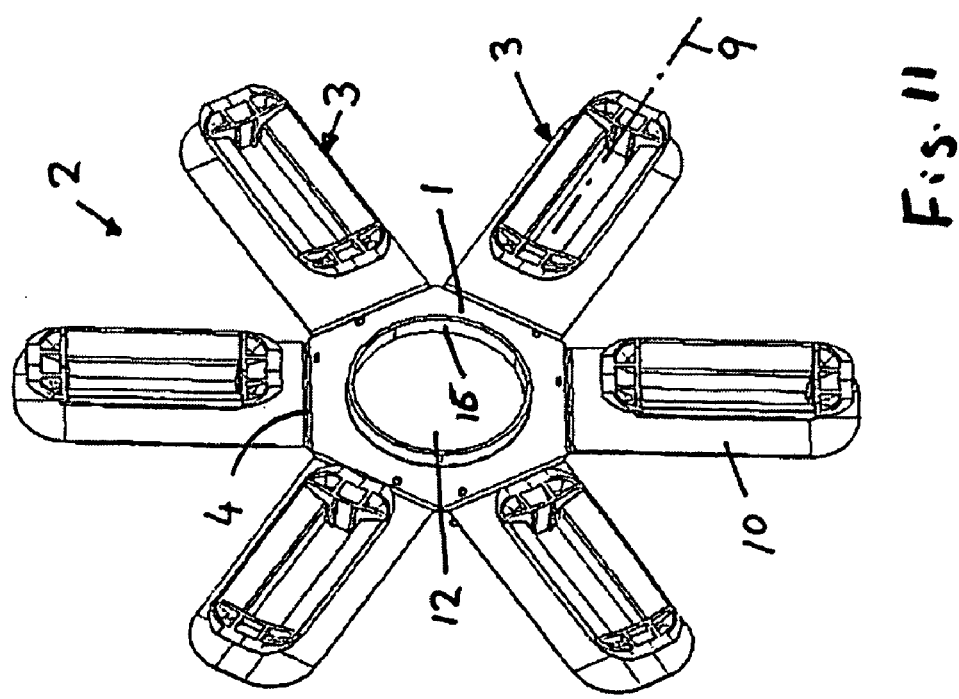
FIG. 11 is a front view of a coil-holding assembly having six coil holders in a position in which they are not yet bent up.
Figure 13:
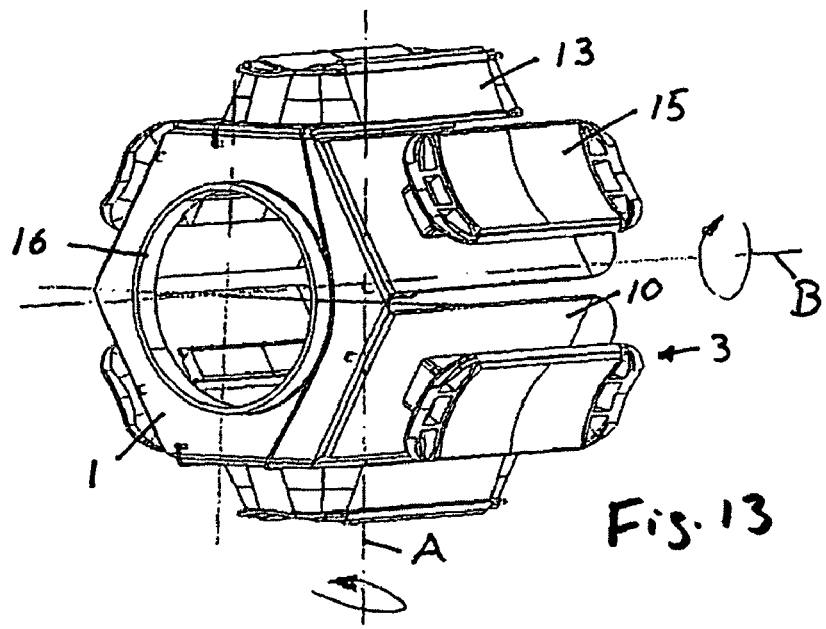
FIG. 13 is a coil-holding assembly having coil holders on the outside, of which two are wound.
Figure 14:
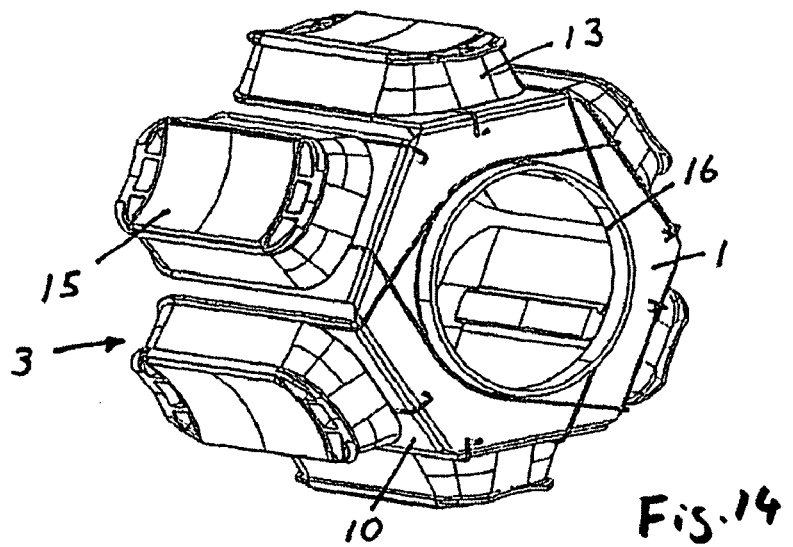
FIG. 14 is a coil-holding assembly having coil holders on the outside, all of which are wound.
Figure 15:
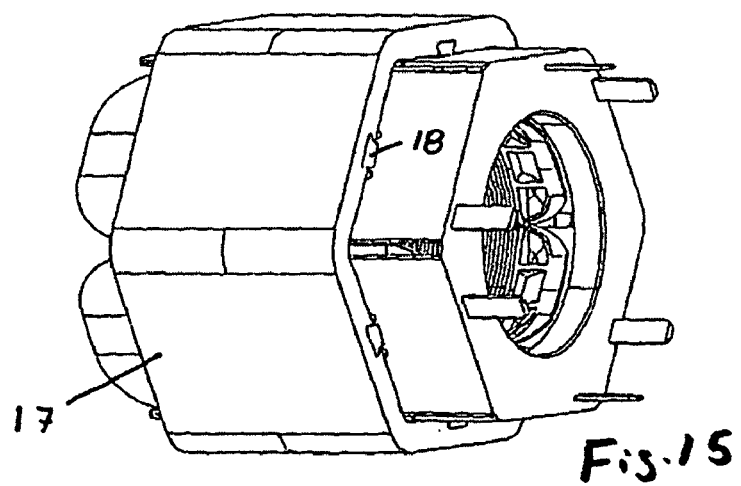
FIG. 15 is a coil-holding assembly having wound coil holders on the inside.

Coil holders 3 made of plastic are formed in one piece onto a planar support 1 of a coil-holding assembly 2 made of plastic and respective individual coils 13 of a stator are wound onto this assembly in large-scale mass production. The coil holder 3 with their hollow plastic cores 8 onto which the wire of the coil is wound are oblong, i.e. they have a greater length L than width B, with the longitudinal axis 9 extending radially of the support 1. The individual coil holders 3 are arrayed symmetrically in a star around the central plastic support 1 and are connected with it by hinges, in particular integral film hinges 4. On the support 1, which carries circuit traces are applied, preferably using MID (Model Interconnect Devices) technology, the electrical circuitry connecting the individual coils to one another is produced. Furthermore, this MID structure serves as a support and circuitry element for all or some of the necessary electrical/electronic components. Electrical connectors 5 are attached on the support 1 at suitable locations, for connections to electrical supply and/or control lines. In this way, the support is used like a printed-circuit board.

The coil-holding assembly 2 has four or more coil holders 3 distributed in the plane in a star shape and formed of insulation bodies on which the individual coils are wound. Since each coil holder 3 with its plastic core 8 holding the windings has an oblong shape and its longitudinal axis 9 is radial relative to the center of the assembly and of the support 1, a hole 11 also has an oblong shape and extends radially in the position in which it is not yet bent up. The coil holder 9 comprises an outer plate 10 having a central opening 12 in it and in the core 8. The outer plate 10 lies in the plane of the support 1, and is connected with the support 1 by the film hinge.

Depending on the winding method used for the coil holders 3 to be wound, in the plane of the support 1 (flyer, needle winder), the assembly 2 is rotated in the tool about a certain angle (linear winder). For reasons of imbalance, it is advantageous to bend the coil holders 3 that lie opposite one another symmetrically. After a coil holder 3 has been wound, the wire is moved directly to the opposite coil holder 3 in guide tracks provided for this purpose. The beginning and the end of the coils are conductively connected with the MID structure. All the known contact methods, such as cutting/clamping technique, soldering, welding, etc., are possible for contacting the winding ends with the MID structure. After all the coil holders 3 have been wound, they are flipped, i.e. bent into their final position, and connected with the metallic flux ring.

The coil-holding assembly 2 to be wound is attached to a rotary drive of the winding tool in its axis of symmetry. At the edge of the coil holder 3, at the transition to the central MID structure, the coil holder 3 to be wound, or for reasons of symmetry at high winding speeds the opposite coil holders or all the coil holders, is/are rotated into a suitable winding position at a defined angle, by a film hinge 4, by means of the winding tool, and held in place there.

The coil holder 3 is fixed in place in this position, and wound by means of a flyer, a needle winder, or a linear winder. After a coil has been completed, the assembly 2 is rotated about its axis of symmetry in the tool, in such a manner that the wire is passed to the preferably opposite coil holder 3 by wire guides that are provided, in order to wind this coil holder. Thus, no separate contact bridge between the interconnected windings is required.

At the beginning and end of the coils, contact points on the MID structure of the support 1 are provided. These serve for contact between winding ends and MID circuit trace. The necessary contacting is preferably already implemented during the winding process. Thus, at the end, a wound coil-holding assembly 2 with electronics is obtained, which is subsequently tested electrically and/or electronically. After all the coil holders 3 are wound, individual pole pieces 6 are pushed into the holes 11 of the coil holders 3, and the coil holders are pivoted into their final position and completed with the flux ring 7.

In the center between the coil holders 3, there is an MID structure on the support 1 that accommodates the electrical/electronic components required for operation of the motor, or parts of them, in a functionally appropriate manner. This MID structure is configured in different ways, depending on the application case, for low-voltage or high-voltage supply of the coils.

The central circuitry geometry of the support 1 also comprises the power connection of the motor to the power supply, as well as the electrical connection for a control or control line. If necessary, all the connection lines are combined in a plug connection preferably mounted at the edge of the support.

The stator described above, with electronics and electrical connection, is preferably potted in plastic. At the end, a stator module is produced that is quickly and reliably assembled with the rotor module, the motor housing, in particular pump housing, and, if necessary, with other electronic modules, to produce a motor, in particular a motor pump.

In the illustrated embodiment, four coil holders 3 are oriented with point symmetry about the central support 1, so that the longitudinal axes 9 of the coil holders 3 form angles α of 90° relative to one another, in the flat, not yet bent-up condition of the assembly 2. Instead, however, six, eight, or more coil holders 3 can also be formed on the central support 1 and oriented with point symmetry, the angles α between the coil holders 3, i.e. their longitudinal axes 9, again being equal.

Furthermore, the hinges 4 can have a snap connection.

In the following, the method of functioning of a complex automatic linear winding machine for large-scale mass production will be described. In the case of smaller numbers of pieces, individual work steps can be carried out manually.

In a first work step, the coil holders 3 (winding formers) are equipped with pole pieces 15 by means of a robot, and passed to the automatic winding machine in such a manner that the coil holders to be wound are directed with their pole pieces 15 outward, and with their longitudinal axes 9 parallel to the central axis. The pole pieces 15 have contact geometries 18 for attachment to the flux ring 17, for example dovetails. These are directed toward the center of the support 1, in the case of the coil-holding assembly 2 to be wound, and serve for centering and attaching the coil-holding assembly 2 on the winding machine.

After such a coil-holding assembly 2 has been loaded into the winding machine, it is pivoted into the winding position about the axis of rotation A. Contacts are affixed to the coil-holding assembly 2 that serve for electrically connecting the coils with the electrical/electronic components of the motor. In the next work step, the beginning of the winding wire is connected with the corresponding contact. This can be a weld, bond, solder, cut/clamp technique, etc., for example. Subsequently, the first coil is wound by winding the coil holder 3, with the coil-holding assembly 2 rotating about the axis of rotation A.

After completion of the first coil, the coil-holding assembly 2 is rotated about its own axis of symmetry B, until the next coil holder 3 to be wound is in the winding position. In this connection, the winding wire lays itself from the end of the first coil to the beginning of the second coil, about a wire guide 15 formed on the coil-holding assembly 2 or on the coil holder 3, and produces an electrical connection between the two coils. Winding of the second coil takes place analogous to the first. After completion of the second coil, the end of the wire is conductively connected with a contact provided for this purpose, analogous to the beginning of the wire of the first coil. The other coil pairs are subsequently produced analogous to the first coil pair. Alternatively, however, two coil holders that lie diametrically opposite one another can always be wound at the same time.

After completion of the winding process, the coil-holding assembly 2 is passed to another work station. In this connection, the wound coil holders 3 are rotated about the hinges formed on the support 1, to such an extent that they have reached their final installation position, and the flux ring 17 can be pushed on. Subsequently, the complete stator is electrically tested, and passed on to a subsequent work station for further assembly.

The winding method using a flyer automatic winding machine takes place analogous to the method using a linear winder. However, the axis of rotation A serves only for fitting the automatic winding machine with coil holders. In contrast to the linear winder, the wire rotates around the coil, not the coil around the wire.

The invention claimed is:

1. A coil-holding assembly for an electrical machine, the assembly having coil holders made of plastic and on which coils of a stator can be wound, the coil holders being formed and pivotal on an outer edge of a planar central plastic support by respective integral film hinges between a winding position parallel to a plane of the support and a bent-up position perpendicular to the plane.

2. The coil-holding assembly according to claim 1 wherein at least four coil holders are attached to the support and in the winding position extend radially therefrom and in a star shape.

3. The coil-holding assembly according to claim 1 wherein the coil holders are oblong with a longitudinal axis of the coil holders extending radially of the support in the winding position.

4. The coil-holding assembly according to claim 1 wherein the coil holders can be bent out of the plane of the support about the respective hinges toward a front or back face of the support.

5. The coil-holding assembly according to claim 1 wherein each coil holder has a rear outer plate made of plastic that is connected with the support by the respective hinge and onto which a plastic core of the coil holder is formed.

6. The coil-holding assembly according to claim 5 wherein there is a hole for the pole piece in the outer plate and the plastic core.

7. A coil-holding assembly for an electrical machine, the assembly having coil holders made of plastic and on which coils of a stator can be wound, the coil holders being formed and pivoted by respective integral film hinges on an outer edge of a central plastic support that itself is formed with a central opening for a machine shaft.

8. A coil-holding assembly for an electric motor, the assembly comprising:
   a central generally planar plastic support centered on an axis and having a plurality of straight outer tangentially extending edges;
   respective substantially identical coil holders each comprised of a plate juxtaposed with a respective one of the edges and a coil core projecting from the plate; and
   respective film hinges integrally formed with the outer edges and the respective plates for pivoting of the plates about the edges relative to the support between a starting position coplanar with the support, a use position generally perpendicular in one direction from the support, and a winding position extending generally perpendicular in an opposite direction from the support.

9. The coil-holding assembly defined in claim 8, further comprising
   a coil wound on each of the cores.

* * * * *